Oct. 16, 1962 W. R. KROMER 3,058,620
METHOD OF AND APPARATUS FOR CARBONATING, COOLING,
STORING, DISTRIBUTING AND DISPENSING BEVERAGES
Filed Aug. 11, 1959 3 Sheets-Sheet 1
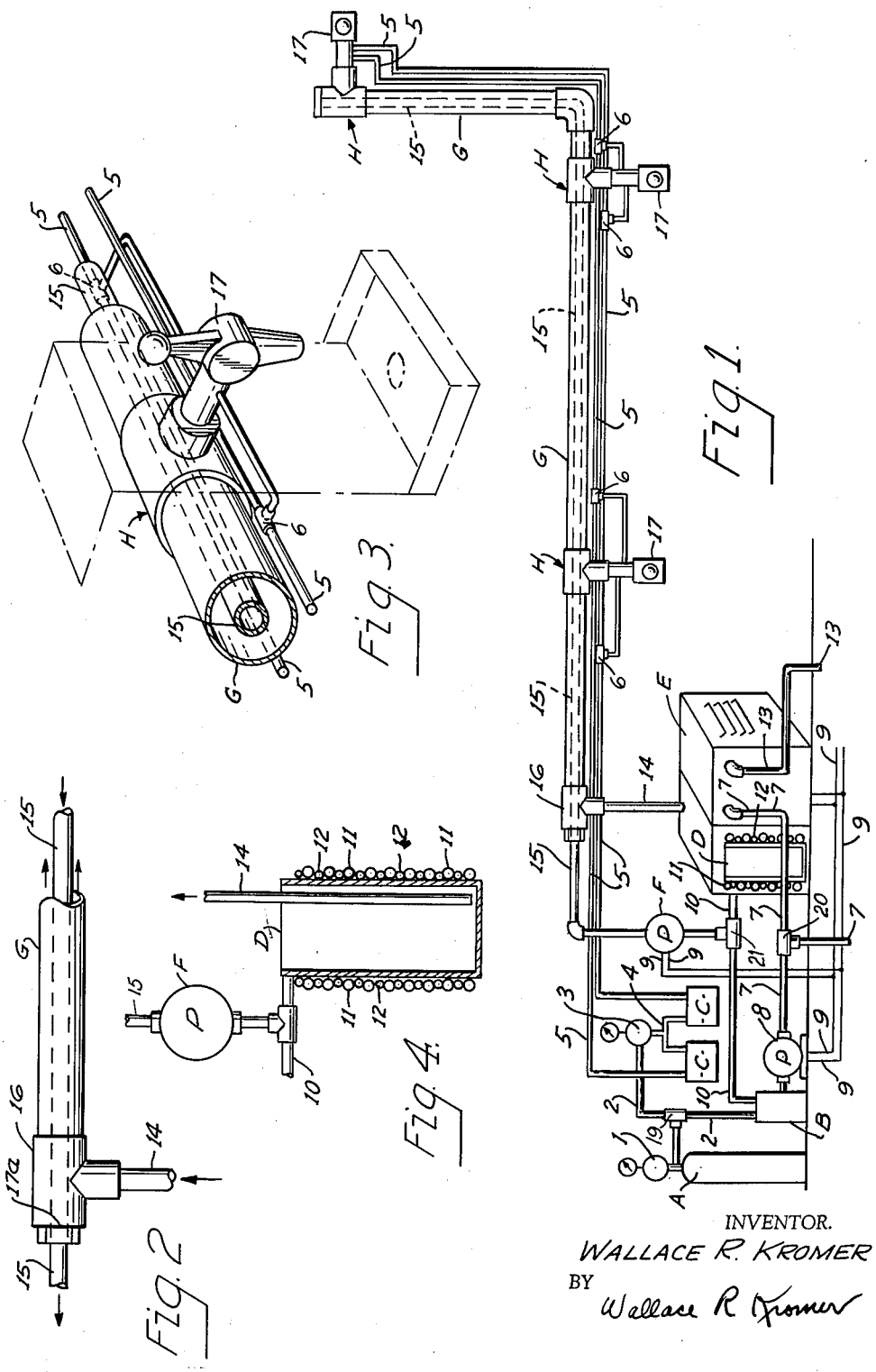
INVENTOR.
WALLACE R. KROMER
BY
Wallace R. Kromer

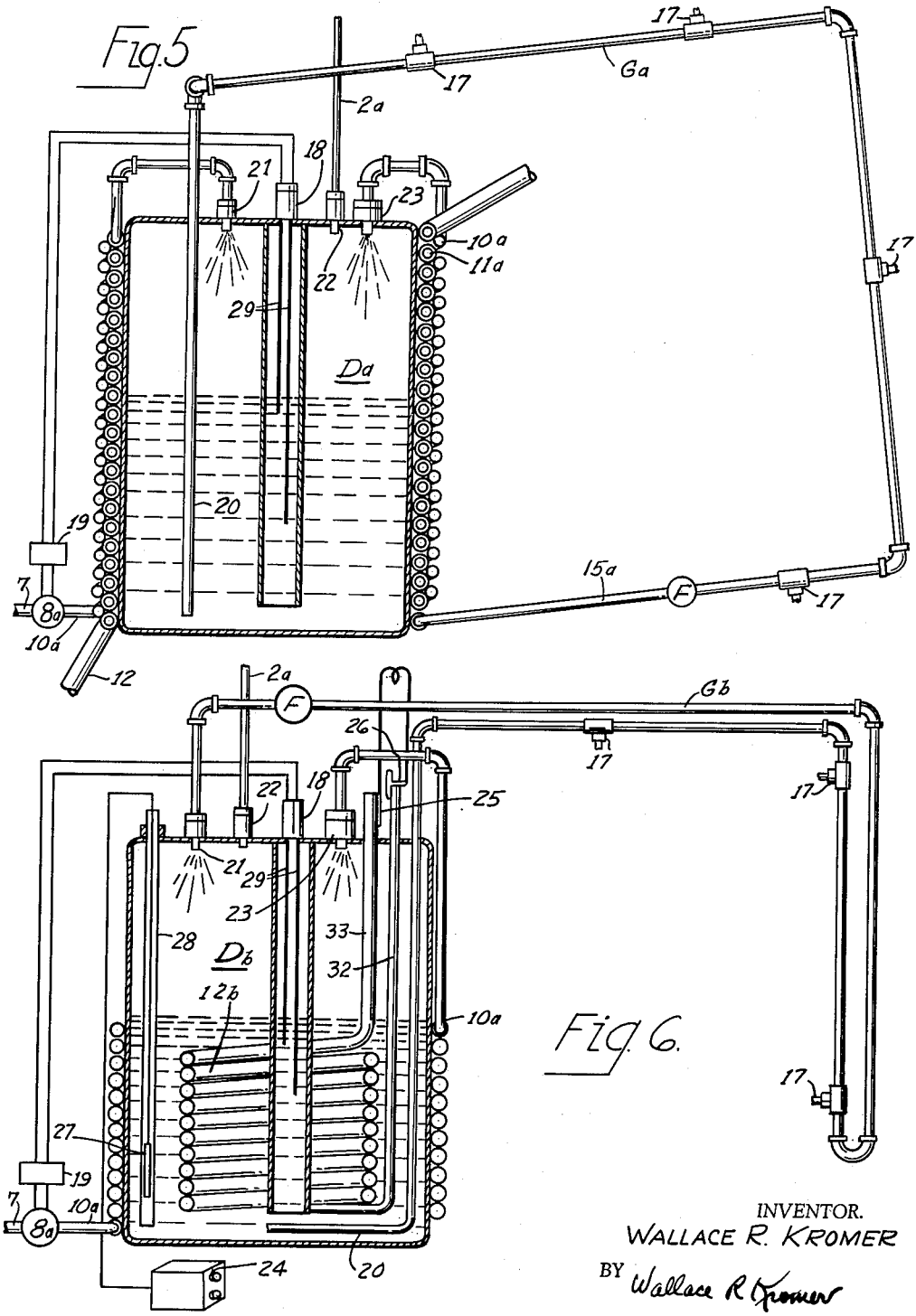

United States Patent Office 3,058,620
Patented Oct. 16, 1962

3,058,620
METHOD OF AND APPARATUS FOR CARBONATING, COOLING, STORING, DISTRIBUTING, AND DISPENSING BEVERAGES
Wallace R. Kromer, Cleveland, Ohio
(16491 Northvale Blvd., Cleveland Heights 12, Ohio)
Filed Aug. 11, 1959, Ser. No. 832,969
20 Claims. (Cl. 222—1)

This invention relates to an improved method of and apparatus for carbonating, cooling, storing, distributing and dispensing beverages, the invention being especially useful and having definite advantages in connection with providing and dispensing gas charged beverages such as carbonated water and other gas charged drinks.

Reference is made to application Serial No. 794,088, filed February 18, 1959, now Patent Number 3,011,681, by Wallace R. Kromer, for Method of and Apparatus for Cooling, Storing, Mixing and dispensing Beverages, of which this is a continuation-in-part.

Existing systems that provides mixed soft drinks or plain carbonated water used in retail stores, restaurants, or bars generally employ a common carbonator unit consisting of a pump, motor, relay, tank and supply lines to provide water to the pump through lines to the tank and carbon dioxide gas to the tank. Carbon dioxide gas is supplied to the carbonator tank under regulated pressures of approximately 100 to 125 pounds. Water, usually from the city water supply, is pumped into this tank filled with carbon dioxide gas with a spraying or squirting action so that a percentage of the carbon dioxide gas is absorbed in the water and provides carbonated water. An electrode arrangement within the tank shuts off the pump through a relay when the water level reaches a predetermined upper level within the tank and starts the pump to repeat the cycle when water is drawn from the tank to a predetermined lower level. Cooling the water to 40° or lower before spraying it into the tank is sometimes employed and desirable as low temperature water has a greater affinity for carbon dioxide gas. Some systems cool in the tank or at the point of dispensing on the theory that doing so will retain a reasonable carbon dioxide content in the water; this method requires a high carbon dioxide gas pressure in the tank.

Existing systems provide this carbonated water to the dispensing faucet or faucets through lines running from the carbonator. The water lies inactive in the carbonator and in the lines until it is drawn from a faucet. We refer to this common method of carbonating as "single stage carbonating."

One of the principal objects of the present invention is to provide the retailer or purveyor of beverages with a compact dispensing system for water and other carbonated beverages that will produce highly carbonated water and soft drinks of uniform predetermined temperature; more specifically, to provide a method of and an apparatus for continuous and two stage carbonation of water for use as or in a beverage.

Another object is to provide a method of and apparatus for cooling, carbonating and storing water in which the dispensing may be done at a plurality of distributed points while the cooling is accomplished at a single point or area so as to minimize complexity and cost of the cooling means.

A further object is to provide a system for suppling carbonated water for beverage purposes in which a relatively high degree of carbonation is achieved with relatively low carbon dioxide pressure. As a secondary objective related to the relatively low carbon dioxide operating pressure with which satisfactory results can be realized is the reduction in expense of operating and maintaining the system as well as the low original cost, leaks and related troubles being minimized with the lower pressure that can be used.

Other principal objects are to maintain low temperatures throughout a multiple station carbonated beverage distribution system, to maintain high carbon dioxide content in the water or beverage through constant refrigeration and to supply such water or beverage throughout such a system to dispersed dispensing stations.

The present invention has, in addition to the objects set forth herein, the same objects and advantages as those set forth in the patent application referred to; they are hereby incorporated herein as through set forth at length; they are achieved and there are also achieved the objectives set forth herein, including the features relating to the two stage and continuous carbonation, by providing a system which comprises in combination, this being a further and more specific object of the invention, a combined storing and carbonating receptacle or tank adapted to contain water and, above the water an atmosphere of carbon dioxide under pressure, one or more dispensing faucets remote from the receptacle, conduit means connecting the receptacle to a water source and to the faucet or faucets with the receptacle and the faucet or faucets in a closed circuit comprising a feed path from the receptacle to the faucet or faucets and, separate from the feed path, a return path from the faucet or faucets to the receptacle; the contemplated system of the invention also includes in the combination pumping and controlling means forcing water in the circuit to flow continuously thereabout and forcing water from the source into the circuit to replace that dispensed from the faucet or faucets from time to time and automatically maintaining the level of the water in the receptacle between predetermined limits; the system further includes in the combination means supplying carbon dioxide to water flowing in the circuit and maintaining therein and in the atmosphere within the receptacle a carbon dioxide pressure between predetermined limits; and the system includes means directing the flowing water and causing it to flow through the carbon dioxide atmosphere in a form having a high surface to cross section ratio so as to provide continuous and repetitious exposure of the circulating water to the carbon dioxide atmosphere for continuous carbonation.

Still further objects and advantages which pertain to certain useful and novel features of construction and combinations of parts advantageous in installation and operation of a system such as referred to will be apparent from the following detailed description of the invention made in connection with the accompanying drawings which form a part of the specification. Like parts throughout the several views are indicated by the same letters and numerals of reference.

In the drawings:

FIGURE 1 is a diagrammatic view and layout as in my co-pending application referred to, partly elevational, partly in plan and partly in perspective, showing a beverage making, cooling, storing, and dispensing system, illustrative of and embodying principles of the present invention;

FIGURE 2 is a fragmentary elevation detail showing a portion of the main conduit or manifold and certain of the related conduits employed in the apparatus of FIG. 1, and enlarged with respect to that figure;

FIGURE 3 is a fragmentary perspective view of a dispensing station assembly as employed in the apparatus of FIG. 1, this view being partly in phantom and enlarged with respect to that figure;

FIGURE 4 is a vertical sectional view, partly diagrammatic, with parts broken away and removed, through the receptacle or storage tank, of the system of FIG. 1, showing the attached refrigerant lines or coils and the incoming carbonated water line or supply tube through the circulating pump, this view being enlarged with respect to that figure;

Figure 7:
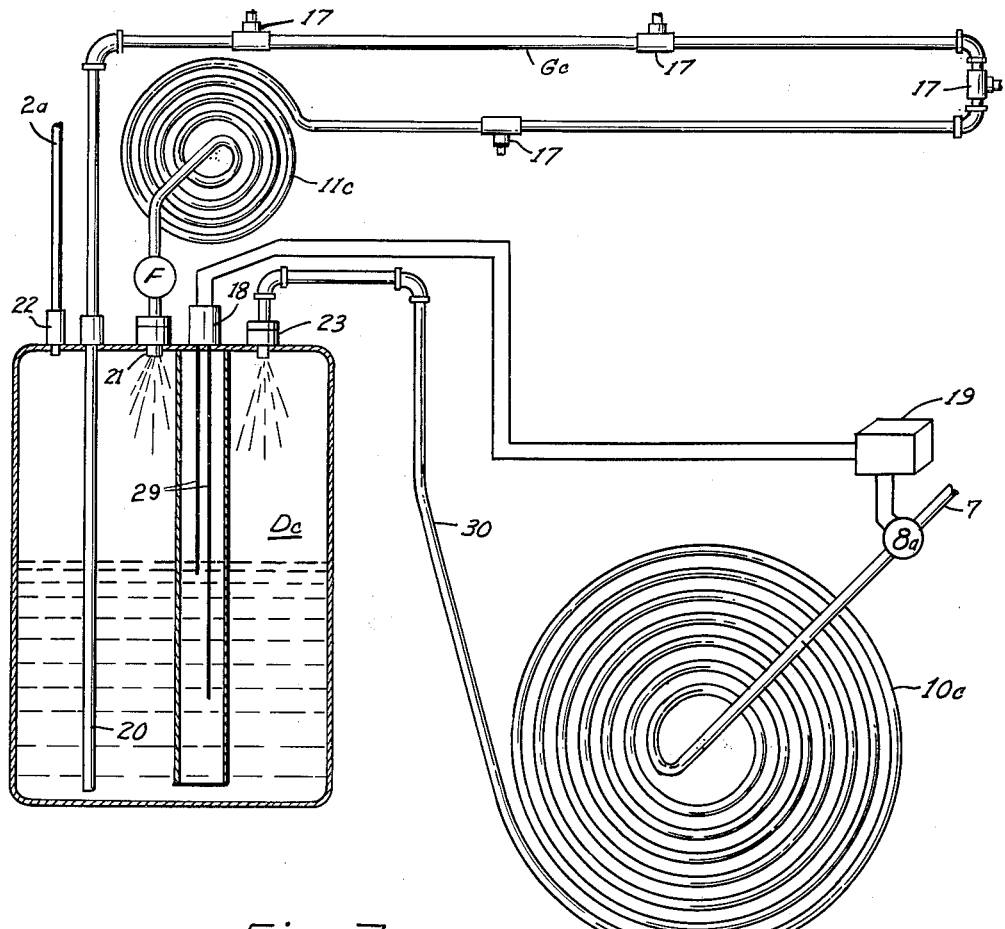

FIGURE 5 shows a modification of the system of FIGS. 1 through 4 in which an atmosphere of carbon dioxide is maintained in the storage receptacle and it constitutes a carbonator, the circulating water and the water introduced to replace that dispensed being passed through such atmosphere, this view being enlarged with respect to FIG. 1, partly diagrammatic, partly in section and with parts removed:

FIGURE 6 shows another modification similar to that of FIG. 5 in which an evaporator coil for refrigerant is located within the storage receptacle and is immersed in the water to freeze a portion of the latter and provide reserve refrigeration capacity, this view also being enlarged with respect to FIG. 1, partly diagrammatic, partly in section and with parts removed; and FIGURE 7 shows still another modification similar to those of FIGS. 5 and 6 in which the conduit through which water is supplied to the system and the conduit through which the carbonated water is circulated externally of the storing and carbonating receptacle each includes a heat exchange portion adapted to be maintained in heat exchange relation to a refrigerating medium, this view also being enlarged with respect to FIG. 1, partly diagrammatic, partly in section, and with parts removed.

In the illustrated system for mixing, cooling, storing and dispensing carbonated non-alcoholic beverages, the components are, in general, represented diagrammatically for the reason that, except where structure is specifically described and illustrated, the invention is concerned with the combinations involved rather than with the structural details of the individual parts and components. A $CO_2$ storage tank A, equipped with a high pressure regulator 1 and gauge, delivers $CO_2$ gas through a conduit or line 2 to low pressure regulator and gauge 3 where pressure is regulated to supply through a suitable branched conductor or line 4 a blanket of $CO_2$ gas under regulated pressure on flavored syrups in tanks C. By this gas pressure the syrups are forced to flow through lines 5 which are wrapped tightly to and extend substantially the full length of a refrigerated or main conduit G. T's 6 are provided in the syrup conduits or lines at dispensing stations H so that the syrups are available as needed, being regulated through faucets 17.

Providing highly carbonated water for the apparatus is a carbonator B supplied with high pressure $CO_2$ gas from a T 19 in the line 2 and with drinking water from a suitable source such as, for example, as a city water line 7. Pump 8, connected between the water source and the carbonator B, is driven by a motor using power from electric line 9, forcing water from the source under high pressure into and mixing with the $CO_2$ in the storage tank of the carbonator B. Automatic operation and replenishment of the supply of water to the carbonator B is accomplished by making electrical contact for operation of the water pump 8 through electrodes (such as later referred to in connection with the system shown in FIG. 5) that make and break contact and start and stop the pump in repeating the mixing operation as the surface of the water in the mixing tank of the carbonator is lowered and raised to the contact levels. The carbonated water is forced by the pressure within the storage or mixing tank of the carbonator B through line 10 into a cooling coil 11 attached to and coiled with a refrigerant line 12 wrapped about a storage tank D. A suitable refrigerant condensing unit E, operating automatically, supplies the refrigerant to the conduit 12, the size and capacity of such unit being determined conventionally by the desired rating of the system in gallons of cooled beverage per hour. The temperature of the carbonated water is thus reduced to desired serving temperature before reaching the last coil that empties into the storage tank D.

The refrigerant coil 12 serves a double purpose as, wrapped around the tank D, it holds the temperature of carbonated water stored therein at a predetermined temperature, say between 34 and 40 degrees Fahrenheit. The condensing unit E is preferably water cooled so that its efficiency is not impaired if it is installed in a cabinet or under a counter or in some similar enclosed and restricted space, such water is supplied as from the T 20 in the supply line 7. Waste water exiting from the condensing unit E through pipe or line 13 may be run to drain or can be piped to a sink under or associated with one of the dispensing stations H to provide warm, clean rinse water.

The storage tank D is connected to one, preferably the near, end of the conduit G through a tap rod or dip pipe 14 and a header 16, the carbonated water returning from the other or remote end of the conduit G through a return conduit or line 15. This return line 15 may be run on the outside of and parallel to the supply line G through use of a return bend at the remote station or, as shown, preferably line 15 is run inside the conduit G, through an opening 17A (FIG. 2) in the near header 16 and thence to a circulating pump F, the pump connecting by a T 21 to the supply line 10 from the carbonator B, thereby completing a closed circuit. Placement of the return line within the supply conduit minimizes the surface area of such line exposed for heat gain, no heat being absorbed on the return flow through the refrigerated water within the supply line G. The conduit G and the conduit 15 serve as containers supplementing the storage container D in providing a reserve supply of refrigerated carbonated water.

When the faucet 17 is opened at the last or remote station, any entrapped air will be driven from the conduit G and the return line 15 and the conduit system will fill with refrigerated carbonated water. The circulating pump F, powered by motor supplied with energy from the electric line 9, is in constant operation. Carbonated water is drawn from the remote end of the supply conduit G through the return conduit 15 and circulated through the cooling coil 11, thereby removing any heat gain or pickup by the stream in its travel through the length of the supply and return conduits. The desired rate of flow of the stream of carbonated water depends upon the length of run and the expected heat gain through the walls of the insulated supply conduit. The rate of flow is conveniently adjusted as by change of impeller in the pump F so that in operation the circulating water charged with carbon dioxide varies in temperature very little, in some instances less than about one degree from the tank D to the remote station H.

FIG. 5 illustrates diagrammatically a modification of the system of FIG. 1, only such parts being shown as are necessary to understanding of the changes. The modified apparatus provides for refrigeration of the make-up water before it is commingled with the circulating water, for refrigeration of the water being stored and circulated, for initial or first stage carbonation of the make-up water and for second stage carbonation of the circulating water. Parts which in the system of FIG. 5 are the same as described above in connection with the preceding figures are designated by the same letters and numerals of reference; parts which, in FIG. 5, correspond or are similar to parts previously described are designated by the same reference numerals and letters with the suffix *a*.

Refrigerant line 12*a* is wrapped around and secured to a combined storing, cooling and carbonating receptacle or tank D*a*. Water conduit or line 10*a* is also wrapped around the receptacle D*a*, the convolutions of the water conduit 10*a* being disposed in the valley of the refrigerant coil 12*a*. Water is supplied to the conduit 10*a* through a conduit 7 from a suitable source such as a city water line, the water being forced into the system by a pump 8*a* controlled similarly to the pump 8 of FIG. 1. The upper end of the water coil 10*a* is connected to a combination check valve and nozzle 23 in the top of the receptacle D*a*. Water forced through the coil portion of the conduit 10a and the nozzle device 23 is released and sprayed by the latter into the top or upper portion of the receptacle or tank Da and through an atmosphere of carbon dioxide gas maintained in the receptacle in the space above the level of the water or liquid in the latter. The carbon dioxide gas is forced into the space above the water in the receptacle Da through a combination gas inlet and check valve 22 which is connected by tube or conduit 2a to a suitable souce of $CO_2$ gas under regulated pressure such as the tank A and the regulator 1 of FIG. 1. When the body of water rising in the receptacle Da reaches a predetermined level as sensed by a conventional control assembly 18 comprising contact breaker means and related electrodes, the control assembly operates a relay 19 and shuts off the electric power supply to the motor of the pump 8a, thereby halting the supply of make-up or fresh water to the system.

Externally of the carbonating receptacle or tank Da the water flows through a distributing circuit represented by conduit Ga and return pipe or line 15a and similar to that previously described. The carbonated water leaves the receptacle Da through a dip pipe 20, which corresponds to the tap rod or dip pipe 14 of FIG. 1, circulation of the water through the external circuit and return to the receptacle or tank Da being effected by the continuously operated pump F. The returning water enters the bottom or lower end of and goes through a cooling coil 11a that is within the refrigerant line 12a and is surrounded by refrigerant. From the upper end of the cooling coil 11a the returning water is conducted into the carbon dioxide atmosphere within the receptacle Da, being sprayed through return inlet nozzle 21 mounted through and supported by the top of the tank Da. Thus the water, initially carbonated or charged with carbon dioxide gas in a first carbonating stage when sprayed into the carbon dioxide atmosphere through the combination check valve and nozzle 23, is again and repeatedly carbonated in a continuously functioning second stage when and each time it is sprayed into the carbon dioxide atmosphere of the tank Da through the return inlet 21.

The refrigerant supplied to the coil or line 12a is so controlled that a temperature of approximately freezing is maintained in the cooling coil 11a carrying the circulating carbonated water. Thus the circulating water is conducted through the refrigerated or principal heat release portion of the cycle immediately before being sprayed into the carbonating atmosphere above the water in the receptacle or tank Da. This relatively cold returning water, already containing carbon dioxide from previous treatment, absorbs additional carbon dioxide gas in the second stage treatment and achieves a gas absorption percentage higher than is commercially feasible with single stage carbonation. The two stage carbonating process of the present invention makes it possible to operate with a relatively lower pressure of carbon dioxide gas in the tank Da. In a single stage carbonating system such as shown in FIG. 1 a ratio of between 4 and 5 volumes of carbon dioxide gas to 1 volume of water is obtained with a carbon dioxide gas pressure of from about 100 to about 125 pounds per square inch gauge. Using the two stage and continuous carbonating system of the present invention the water will achieve a gas content of about 5 volumes to one volume of water with a carbon dioxide gas pressure of about 60 pounds per square inch gauge in the tank Ga.

As carbonated water is drawn from the circulating or distributing system through the faucets 17, the water level in the receptacle or tank Da is lowered. However, operation of the pump F is not interrupted and circulation of the water in the conduit Ga continues since the outgoing dip tube 20 is below the lowest operating level of the water within the receptacle Da. As the water level is thus lowered by such release of the carbonated water from the system, it reaches the point at which one of the electrodes 29 in the control assembly 18 actuates the electrical control circuit in accordance with conventional practice to start the motor of the make-up water feed pump 8a so that fresh water is first cooled, then forced into the tank Da and subjected to the first stage of carbonating. Beverage or water dispensed from the circulating system is thus replaced automatically, the pump being stopped when the water level reaches the control setting of the other of the electrodes 29.

In FIG. 6 is illustrated diagramatically another modification of the system of FIG. 1, only such parts being shown as are necessary to understanding of the changes. Parts which are the same as described previously are designated by the same letters and numerals of reference; parts which correspond or are similar to parts previously described are designated by the same reference numerals and letters with the suffix b. In this modified arrangement a refrigerating medium is circulated through and evaporated in a coil 12b immersed in the water contained in a carbonating and storing receptacle or tank Db which corresponds to the tanks D and Da previously described. The water circuit external to the receptacle Db is through a conduit Gb similar to the conduit G of FIG. 1. The immersed or enclosed coil 12b is conventional tubing such as used for beverages of stainless steel or material of like characteristics such that no chemical reaction with the carbonated water will result.

A thermostatic expansion valve 26 controls the supply of liquid refrigerant to the immersed evaporator coil 12b, the refrigerant being a gas such as freon supplied by a conventional compressor unit. From the valve 26 the refrigerant is conducted to the lower end of the refrigerant coil 12b through a conduit 32. A bulb 25 is attached to return tube 33 from the coil 12b and is arranged to close the expansion valve 26 on cooling of the system and open it on warming of the system. Ice builds up on the refrigerant coil 12b immersed in the body of water contained in the carbonating and storing tank Db. When the build up results in the ice touching or making substantially direct heat exchange with a bulb well 28 in which a thermostatic control bulb 27 is inserted, a conventional temperature control 24 is thereby actuated to shut off the refrigeration compressor. Circulation of the refrigerant is thus arrested until the ice retreats, at which time the warm up of the bulb 27 acts through the control 24 to start the refrigeration compressor and feed refrigerant into the coil 12b and repeat the cycle.

Incoming make-up water for the initial or first stage carbonation is sprayed into the receptacle or tank Db through the check valve and nozzle 23 after precooling through a coil 10b wrapped around the outside of and in direct heat exchanging contact with the lower part of the receptacle Db containing refrigerated water.

The cycling or circulating of refrigerated carbonated water through the system is accomplished continuously by the pump F. The water is drawn from the bottom of the tank Db, circulated through the conduit Gb (which may be essentially the same as G in FIG. 1) conducted past the faucets 17 and, except for that withdrawn at the faucets, returned to the tank Db through the combination check valve and nozzle 21, thereby completing the circuit with the second stage carbonation occurring continuously as the water is sprayed into the top of the tank through the nozzle. As in the system described in connection with FIG. 5, it is the relatively low temperature returning water that is continuously sprayed into the carbon dioxide atmosphere maintained in the upper part of the combination storing and carbonating receptacle (Db in FIG. 6, Da in FIG. 5) the low temperature of the water being conducive to its becoming saturated with the carbon dioxide gas; such returning recarbonated water goes directly into the reserve supply maintained automatically at a predetermined level and temperature in the lower part of the receptacle Db.

The ice bank on the refrigerating coil 12b provides reserve cooling capacity for peak service periods. The body of carbonated beverage or water maintained on reserve in the receptacle Db, because of its high carbon dioxide gas content and the fact that it is kept in continuous motion, can be safely reduced in temperature close to the freezing point of water at the same pressure without freezing danger. The lower temperature thus achieved in practice provides a more palatable drink, requires less ice in the serving glass and results in less dilution of the beverage.

In FIG. 7 is illustrated diagrammatically another modification of the system of FIG. 1, only such parts being shown as are necessary to understanding of the changes. In this modification there is also provided first and second stage continuous carbonation similar to the arrangements of FIGS. 5 and 6. Like parts are indicated by the same reference numerals, corresponding or similar parts are indicated by the same numerals with the suffix c.

Incoming make-up water or beverage supplied as from the city water line or conduit 7 and the pump 8a is passed through a coiled line or pre-cooling conduit 10c adapted to be located in a conventional refrigerated space such as a water bath or ice cube storage bin located in the purveyor's existing facilities. From the pre-cooling coil 10c the make-up water is conducted to the combination nozzle and check valve 23 through a suitable conduit or flexible connector 30. A pre-cooling coil 11c, similar to the pre-cooling coil 10c, is connected between the return end of distributing conduit Gc and the circulating pump F for the purpose of cooling the returning carbonated water to the desired low temperature immediately prior to projecting such carbonated water through the nozzle 21 into the carbon dioxide atmosphere in combination storing and carbonating receptacle Dc in the second stage carbonation previously referred to. The pre-cooling coil 11c is located in a suitable refrigerating environment such as a water bath or ice cube storage bin of the purveyor's existing facilities. The carbonator tank or receptacle Dc may likewise be located in the same refrigerated space, water bath or ice cube storage bin. Thus the arrangement of FIG. 7 provides a two stage carbonating system and a primary circulating and cooling system for water or other beverage using existing refrigeration facilities, thus achieving the desired result at low cost.

In accordance with the patent statutes the principles of the present invention may be utilized in various ways, numerous modifications and alterations being contemplated, substitution of parts and changes in construction being resorted to as desired, it being understood that the embodiments shown in the drawings and described above and the particular methods set forth are given merely for purposes of explanation and illustration without intending to limit the scope of the claims to the specific details disclosed.

What I claim and desire to secure by Letters Patent of the United States is:

1. The method of cooling, storing and dispensing carbonated water which comprises
    maintaining a body of carbonated water in heat exchange relation with a refrigerating medium,
    withdrawing such water from the body continuously,
    circulating the withdrawn water over a closed path and in a continuous stream of relatively small cross sectional area past a remote dispensing point,
    returning the circulated water to said body,
    intermittently releasing water from the stream at the dispensing point for consumption as desired,
    maintaining a confined atmosphere of pressurized carbon dioxide in the path of the circulating water and passing the circulating water through and picking up carbon dioxide from such carbon dioxide atmosphere for augmentation of the carbon dioxide content of such circulating water,
    automatically adding water to said body to replace that released for consumption to maintain said body within predetermined volumetric limits,
    and automatically adding carbon dioxide to said atmosphere in replacement of that picked up by the circulating water to maintain the carbon dioxide atmosphere within predetermined pressure limits.

2. In the method of cooling, storing and dispensing carbonated water as defined in claim 1,
    maintaining the carbon dioxide atmosphere over and in surface to surface contact with the body of carbonated water.

3. In the method of cooling, storing and dispensing carbonated water as defined in claim 2,
    spraying one of said returning water and said replacement water directly into the carbon dioxide atmosphere and travelling it thence directly into said body.

4. In the method of cooling, storing and dispensing carbonated water as defined in claim 1,
    carbonating the replacement water before it is added.

5. In the method of cooling, storing and dispensing carbonated water as defined in claim 1,
    maintaining the heat exchange relation by circulating the refrigerating medium over a path completely surrounded by the body of water and maintaining a bank of ice about such surrounded path and immersed in the body of water.

6. In the method of cooling, storing and dispensing carbonated water as defined in claim 5,
    maintaining the carbon dioxide atmosphere over and in surface to surface contact with the body of water and spraying both the returning and replacement water into said atmosphere.

7. In the method of cooling, storing and dispensing carbonated water as defined in claim 1,
    spraying one of said circulating water and said replacement water into said carbon dioxide atmosphere.

8. In the method of cooling, storing and dispensing carbonated water as defined in claim 1,
    passing the replacement water over a predetermined course in heat exchange relation with a refrigerating medium to cool it and also carbonating the cooled replacement water prior to adding it to the body of water.

9. In the method of cooling, storing and dispensing carbonated water as defined in claim 5,
    passing the replacement water over a predetermined course in direct heat exchange relation with the body of water solely through metal conduction for pre-cooling prior to adding the replacement water to said body of water.

10. In the method of cooling, storing and dispensing carbonated water as defined in claim 9,
    maintaining the carbon dioxide atmosphere over and in surface to surface contact with the body of water and spraying both the returning circulating water and the pre-cooled replacement water through said atmosphere.

11. In a beverage system for carbonating, refrigerating, storing and dispensing water,
    a storage receptacle containing water and, above the water, an atmosphere of carbon dioxide,
    a dispensing faucet remote from the receptacle,
    conduit means connecting the receptacle to a water source and the faucet and the receptacle in a closed circuit comprising a feed path from the receptacle to the faucet and, separate from the feed path,
    a return path from the faucet to the receptacle,
    pumping and controlling means forcing water in the circuit to flow continuously thereabout and forcing water from the source into the circuit to replace that dispensed from the faucet from time to time and automatically maintaining the level of the water in the receptacle between predetermined limits, means supplying carbon dioxide to water flowing in the circuit and maintaining therein and in said atmosphere a carbon dioxide pressure between predetermined limits, and means directing the flowing water and causing it to flow through said atmosphere in a form having a high surface to cross section ratio in continuous exposure of the circulating water to carbon dioxide for continuous carbonation.

12. In a beverage system as defined in claim 11, the directing means comprising nozzle means receiving one of said flowing water and said source water and adapted to spray such received water through the carbon dioxide atmosphere.

13. In a beverage system as defined in claim 11,
an evaporator adapted to be included in a refrigerant circuit, said evaporator being immersed in the water in the receptacle, and the system including thermostatic means comprising a sensing element also immersed in the water in spaced relation to the evaporator, said thermostatic means being adapted to govern the flow of refrigerant through the evaporator and to regulate the heat exchange to maintain an ice bank of predetermined thickness on the evaporator and related to the spacing of the sensing element from the latter.

14. In a beverage system as defined in claim 11,
refrigerating means including an evaporator disposed in heat exchange relation to the circulating water,
and said conduit means including a cooling coil disposed in heat exchange relation to the water in the receptacle, the cooling coil being interposed between the source and the receptacle to pre-cool the replacement water.

15. In a beverage system as defined in claim 13,
the conduit means including a cooling coil disposed about the receptacle for heat exchange with the water in the latter, the cooling coil being interposed between the source and the receptacle to pre-cool the replacement water, whereby heat is transferred directly to the ice bank from the circulating water and indirectly through the circulating water from the replacement water to the ice bank.

16. In a beverage system as defined in claim 11,
an evaporator and a cooling coil mounted on the receptacle in heat exchange relation to it and to one another, said evaporator being adapted to be connected in a refrigerant circuit to extract heat from the system, said conduit means comprising said cooling coil with the latter being interposed between the source and the receptacle to pre-cool the replacement water by direct heat transfer from the cooling coil to the evaporator.

17. In a beverage system as defined in claim 11,
the pumping and controlling means including a first pump connected in and actuated to force water along one of said paths continuously, a second pump connected between the source and the receptacle, and a control element responsive to the water level in the receptacle governing the second pump for intermittent operation.

18. In a beverage system for carbonating, refrigerating, storing and dispensing water,
a storage receptacle containing water and,
above the water, an atmosphere of carbon dioxide,
a dispensing faucet remote from the receptacle,
conduit means connecting the receptacle to a water source and the faucet and the receptacle in a closed circuit comprising a feed path from the receptacle to the faucet and, separate from the feed path,
a return path from the faucet to the receptacle,
said conduit means including nozzle means carried by the receptacle and connected to receive water from the return path, pumping and controlling means forcing water in the circuit to flow thereabout and through the nozzle means and from the source to flow into the circuit to replace that dispensed from the faucet from time to time,
said nozzle means being located to direct the returned water into the interior of the receptacle above the water to expose the returned water directly to the carbon dioxide atmosphere before such water commingles with the water in the bottom of the receptacle,
said pumping and controlling means automatically maintaining the level of the water in the receptacle between predetermined limits,
and means supplying carbon dioxide to the circuit including means automatically regulating the carbon dioxide supply to maintain the carbon dioxide pressure in the receptacle within predetermined limits.

19. In a beverage system as defined in claim 18, the nozzle means also being connected to receive replacement water being forced into the circuit and to direct such replacement water into the interior of the receptacle above the water to expose the replacement water directly to the carbon dioxide atmosphere before such replacement water commingles with the water in the bottom of the receptacle.

20. In a beverage system as defined in claim 18,
the conduit means including cooling coil means in series with the nozzle means,
and the system having a refrigerant evaporator immersed in the water in the receptacle,
the cooling coil means being wrapped about and in direct heat exchange relation to the receptacle.

References Cited in the file of this patent

UNITED STATES PATENTS

| | | |
|---|---|---|
| 2,597,293 | Coletti | May 20, 1952 |
| 2,612,357 | Parks | Sept. 30, 1952 |
| 2,721,450 | Entler | Oct. 25, 1955 |
| 2,750,076 | Welty et al. | June 12, 1956 |